Dec. 29, 1959  W. T. GRAHAM  2,918,979
ROOTING AND RAKING APPARATUS
Filed June 5, 1957  2 Sheets-Sheet 1
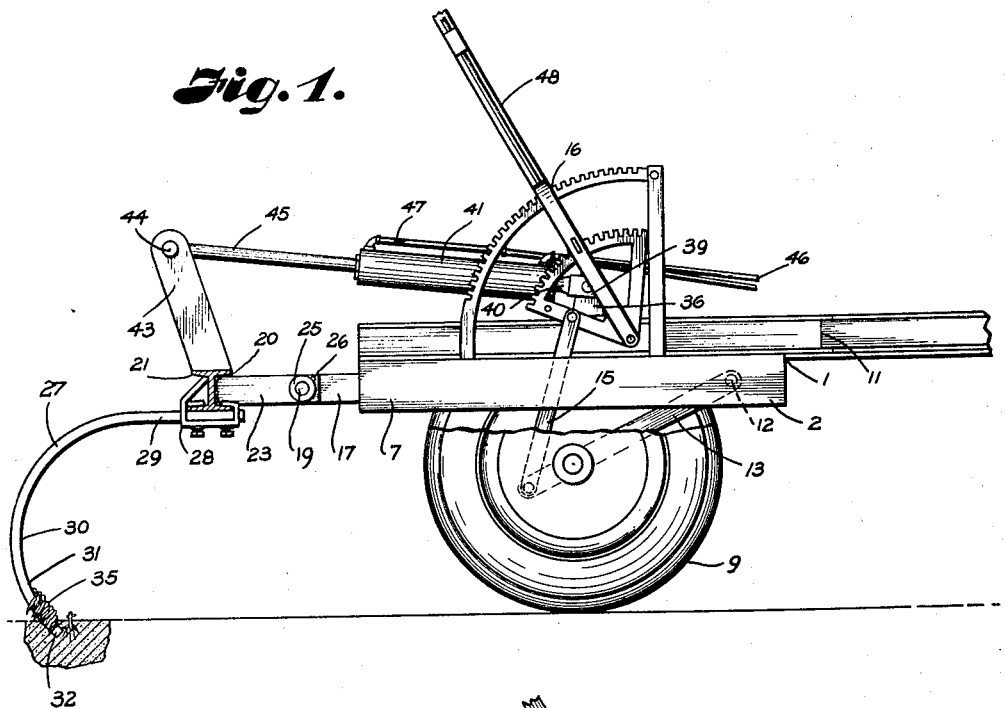
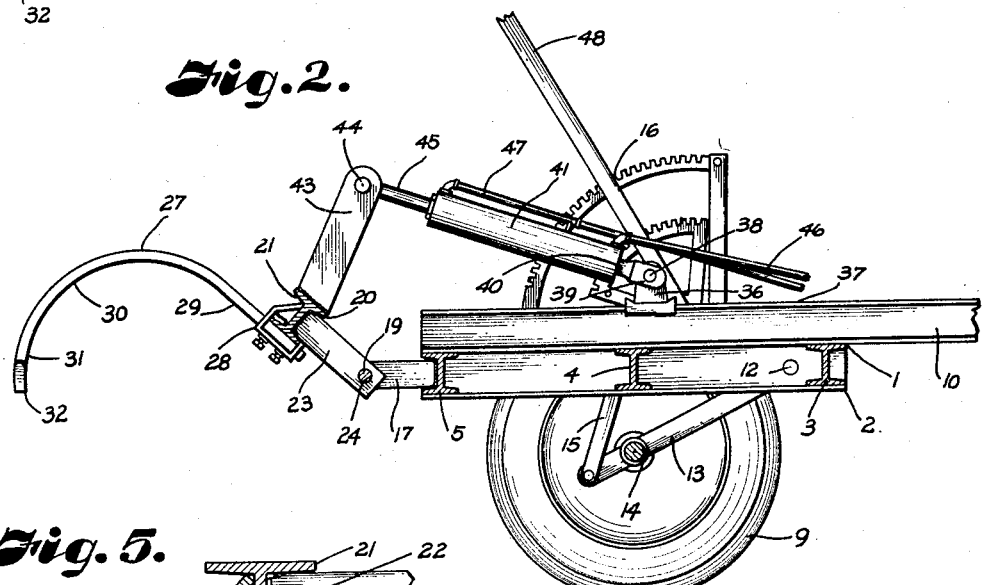
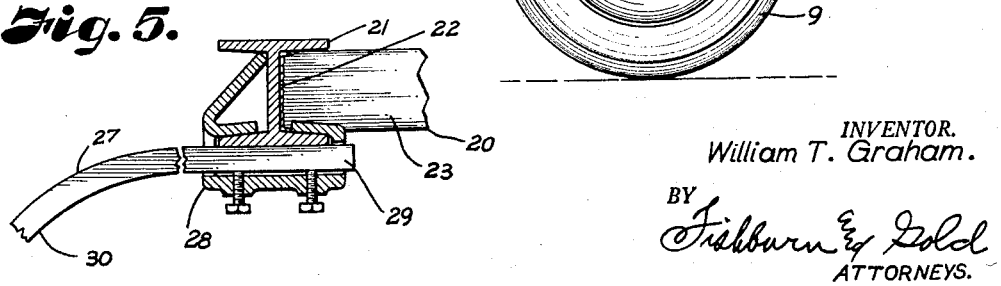
INVENTOR.
William T. Graham.
BY
Fishburn & Gold
ATTORNEYS.

Dec. 29, 1959  W. T. GRAHAM  2,918,979
ROOTING AND RAKING APPARATUS
Filed June 5, 1957  2 Sheets-Sheet 2

INVENTOR.
William T. Graham.
BY
*Fishburn & Gold*
ATTORNEYS.

United States Patent Office 2,918,979
Patented Dec. 29, 1959

2,918,979

ROOTING AND RAKING APPARATUS

William T. Graham, Amarillo, Tex.

Application June 5, 1957, Serial No. 663,790

1 Claim. (Cl. 171—105)

This invention relates to a rooting and raking apparatus, and more particularly to a rooting and raking apparatus for attachment to a frame of a wheeled vehicle.

In breaking new soil and land wherein trees, brush and shrubs of various kinds are pulled from the ground, many roots remain on top and underneath the surface of the ground. Many of these roots are just underneath the surface and are troublesome when the soil is worked with plows of various types requiring some means of removal of the roots and other debris from the ground before tilling.

It is the principal object of the present invention to provide an apparatus for removal of roots and other matter from the surface and just underneath the surface of freshly broken ground so that the roots and other material may be piled for burning or other removal from the land.

Other objects of the present invention are to provide a wheeled vehicle having a frame which may be raised and lowered with respect to the ground; to provide pivotal mounting of a sub-frame on the rear of the main frame; to provide shanks having comparatively sharp points for attachment to the sub-frame at spaced intervals transversely of the frame; to provide hydraulic means for rotating the sub-frame with respect to the main frame to dump or unload the roots and other foreign matter from the shanks of the tool in windrows or other places for burning and removal; to provide means for adjusting the depth of the points of the tool in the ground, and to provide a device of this character simple and economical to manufacture.

In accomplishing these and other objects I have provided improved details of structure the preferred forms of which are shown in the accompanying drawings, wherein:

Fig. 1 is a side view of my device showing the shanks of the rooter engaging the soil.

Fig. 2 is a cross-sectional view taken on a line 2—2, Fig. 3.

Fig. 5 is a cross-sectional view through the clamp for attachment of the shanks to the H-beam of the sub-frame, taken on a line 5—5, Fig. 3.

Figure 3:
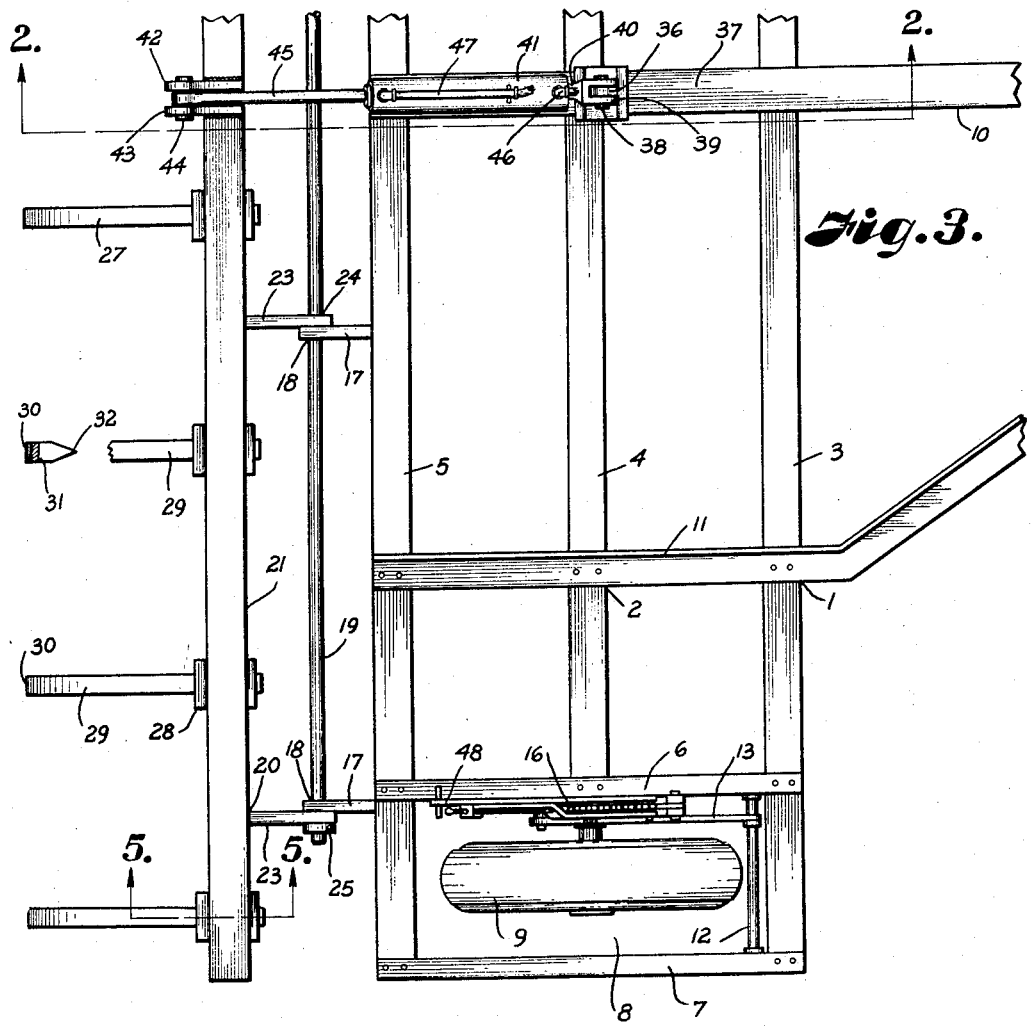
Fig. 3 is a fragmentary top-plan view of the plow frame and sub-frame.

Referring more in detail to the drawings:

1 designates a rooting and raking device embodying the features of my invention which includes a frame 2 consisting of transverse beams 3, 4 and 5 connected by longitudinal bars 6 and 7 forming a pocket 8 on each end of the vehicle for wheels 9, the center beam 4 being shorter than the beams 3 and 5 as best illustrated in Fig. 3. The frame is substantially similar to that shown in my Patent 2,493,811 which includes a tongue 10 extending across the beams and also side braces as indicated at 11 (Fig. 3).

Mounted at the forward end of the wheel pockets 8 and carried between the pairs of longitudinal members 6 and 7 are shafts 12 carrying arms 13 having wheel spindles 14 near their lower ends for journalling the ground wheels 9. The frame 2 is adapted to be raised and lowered with respect to the wheels 9 connecting the free ends of the arms 13 through links 15 with lever mechanism 16 also as illustrated in my Patent 2,493,811 whereby the shanks of the rooting apparatus hereinafter described may be moved into and out of ground working position.

Rigidly secured by welding or other suitable means to the H-beam 5 are a plurality of rearwardly extending short bars 17 spaced along the beam 5 as best illustrated in Fig. 3. The outer ends of the bars are provided with bearing openings 18 for receiving a shaft 19 to which is pivotally attached a sub-frame 20 comprising an H-beam 21 to which are attached by welding or other suitable means as indicated at 22 a plurality of forwardly extending spaced bars 23 having their free ends provided with bearing openings 24 through which the shaft 19 also extends. A collar 25 is mounted on the outer ends of the shaft 19 to retain the sub-frame thereon. The collars are on both ends of the rod and are held in place by a set screw as indicated at 26.

A plurality of rooting or raking shanks or tines 27 are spaced on the H-beam 21 by clamping devices as indicated at 28. The clamping devices are like those illustrated in my Patent No. 2,464,225 or of similar form.

Figure 4:
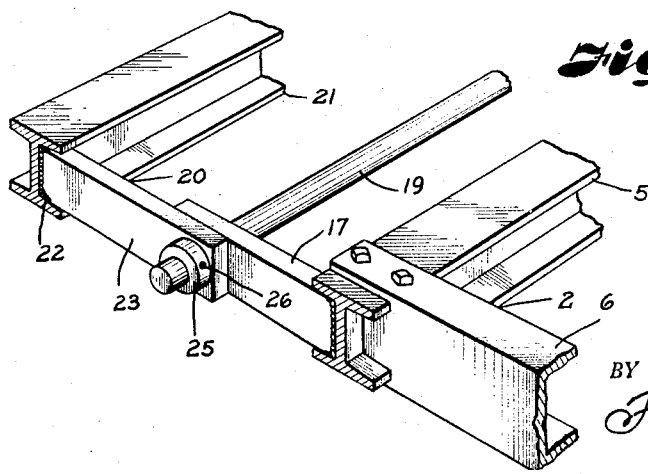
Fig. 4 is an enlarged fragmentary view showing the sub-frame mounting on the main frame, and particularly the rod for pivotally mounting the sub-frame.

The tines include a shank or the like substantially rectangular in cross-section including a substantially straight portion 29 adapted to extend in the direction of travel of the device and a rearwardly and downwardly curved portion 30 which terminates in the forwardly curving end 31 having a point 32. If desired, separate ground engaging tools or blades may be provided and having points for engaging in the ground to pick up the roots and other matter as illustrated in Figs. 4 and 5 of my Patent No. 2,493,811.

For hydraulically rotating the sub-frame on the main frame for dumping or unloading the roots as indicated at 35 from the rake tines, I provide an upstanding bracket 36 on the cross-member 37 of the frame member to which is pivotally attached by a pin 38 a bifurcated end 39 of an arm 40 secured to one end of a double acting cylinder 41. Secured to the H-beam 21 and substantially the center thereof and in alignment with the tongue 10 by welding or other suitable means, are upstanding slightly rearwardly extending arms 42 and 43 to which is pivotally attached by a pin 44 one end of a piston rod 45 extending from the other end of the double acting cylinder 41. Each end of the cylinder is connected by a source of fluid supply (not shown) by lines 46 and 47.

Operation of an apparatus and assembled as described is as follows:

The device may be drawn by a tractor (not shown) as is the usual practice and the frame lowered with respect to the ground wheels by the lever 48 and the sub-frame 20 lowered to the horizontal position shown in Fig. 1 by operation of the hydraulic cylinder 41 to the desired depth required for placing of the points 32 of the shank 27 with respect to the surface of the ground. These may be run two or three inches under the surface of the ground or even deeper if desired. The roots 35 will be picked up from the soil and surface of the soil and will be accumulated in the curved portions 30 of the shanks. When these shanks become relatively filled with roots then, by operation of the cylinder 41 to retract the piston rod 45, the frame 20 will be pivoted on the shaft 19 to dumping position as illustrated in Fig. 2 so that the roots and other foreign matter will be released from the shank 27 and fall in a pile on the surface of the ground. By providing the bars 23 pivoted on the shaft 19 a higher lift is accomplished in dumping of the material 35 than should the beam 21 be pivoted directly on the shaft 19. The sub-frame may then be lowered immediately to working position as shown in Fig. 1.

It will be obvious from the foregoing that I have provided an improved rooter and rake particularly adaptable in breaking new soil where timber, brush and the like have been removed therefrom leaving roots and other matter near the surface of the ground which interfere with tillage.

What I claim and desire to secure by Letters Patent is:

In combination with a main frame having spaced, parallel front and rear transverse H-beams supported by ground wheels and means for raising and lowering the frame with respect to the wheels, rooting and raking apparatus comprising, a sub-frame having a transverse H-beam parallel with and substantially of the length of said rear beam, rearwardly extending spaced arms having one end rigidly secured to the web and flanges of the rear beam of the main frame having bearing openings in their free ends, said outermost arms being spaced slightly inwardly from the ends of the main frame, a shaft rotatable in said bearing openings and extending parallel with said rear beam, forwardly extending arms having one end rigidly secured to the web portion and flanges of the transverse beam of the sub-frame and having bearing openings in their free ends for engaging said shaft adjacent the rearwardly extending arms, collars on the outer ends of the shaft for retaining the shaft in said bearing openings, root gathering shanks spaced transversely of said transverse beam of the sub-frame, said shanks being secured underneath said H-beam of the sub-frame and below the main frame and having points for engaging underneath the surface of the ground for picking up and retaining said roots, adjustable clamping means for attaching said shanks to the transverse beam of the sub-frame for movement of the shanks laterally on said beam of the sub-frame, and hydraulic means for rotating said sub-frame about the axis of said shaft to regulate the depth of the point of the shanks in the ground and to raise the shanks and deposit said roots in a pile for disposal.

References Cited in the file of this patent

UNITED STATES PATENTS

| | | |
|---|---|---|
| 413,836 | Sylvester | Oct. 29, 1889 |
| 2,091,427 | Brodersen | Aug. 31, 1937 |
| 2,228,865 | Bird | Jan. 14, 1941 |
| 2,526,028 | Johnson | Oct. 17, 1950 |
| 2,588,918 | Graham | Mar. 11, 1952 |
| 2,679,793 | Rolf et al. | June 1, 1954 |